United States Patent
Henninot et al.

(10) Patent No.: US 8,545,596 B2
(45) Date of Patent: Oct. 1, 2013

(54) METHODS FOR MANUFACTURING ALLOYED ZINC POWDERS WITH PIERCED PARTICLES FOR ALKALINE BATTERIES

(75) Inventors: Christophe Henninot, Hasselt (BE); Yvan Strauven, Neerpelt (BE)

(73) Assignee: Umicore, Brussels (BE)

( * ) Notice: Subject to any disclaimer, the term of this patent is extended or adjusted under 35 U.S.C. 154(b) by 3 days.

(21) Appl. No.: 13/306,071

(22) Filed: Nov. 29, 2011

(65) Prior Publication Data

US 2012/0096989 A1    Apr. 26, 2012

Related U.S. Application Data

(62) Division of application No. 11/914,501, filed as application No. PCT/EP2006/003657 on Apr. 21, 2006, now Pat. No. 8,142,540.

(60) Provisional application No. 60/683,317, filed on May 23, 2005.

(30) Foreign Application Priority Data

May 19, 2005 (EP) .................................... 05076173

(51) Int. Cl.
*B22F 9/10* (2006.01)
(52) U.S. Cl.
USPC ................................. 75/333; 75/334; 75/354
(58) Field of Classification Search
USPC .................................. 75/333, 334, 354; 264/8
See application file for complete search history.

(56) References Cited

U.S. PATENT DOCUMENTS

| 3,720,737 A * | 3/1973 | Klaphaak et al. ................. 264/8 |
| 6,022,639 A | 2/2000 | Urry |
| 6,284,410 B1 | 9/2001 | Durkot et al. |
| 6,991,875 B2 | 1/2006 | Christian et al. |
| 7,323,031 B2 | 1/2008 | Melzer et al. |

FOREIGN PATENT DOCUMENTS

| EP | 1155464 | 11/2001 |
| WO | WO 2000048260 | 8/2000 |
| WO | WO 2004012886 | 2/2004 |

OTHER PUBLICATIONS

Yule et al., "Atomization of Melts, for Powder Production and Spray Deposition," Clarendon Press, Oxford, (1994), pp. 15-46.

* cited by examiner

*Primary Examiner* — Roy King
*Assistant Examiner* — Ngoclan T Mai
(74) *Attorney, Agent, or Firm* — Brinks Hofer Gilson & Lione

(57) ABSTRACT

The invention concerns alloyed zinc powders for alkaline batteries and a method to manufacture such powders. The powders are characterized by the presence of particles pierced with at least one hole. This appears to benefit the high drain discharge capacity while preserving the process ability of the powder, and the shelf life and the gassing behavior of the batteries. The invented powders can be manufactured using centrifugal atomization in a cooled, oxygen-depleted atmosphere.

3 Claims, 3 Drawing Sheets

METHODS FOR MANUFACTURING ALLOYED ZINC POWDERS WITH PIERCED PARTICLES FOR ALKALINE BATTERIES

This application is a divisional of U.S. application Ser. No. 11/914,501, filed Apr. 18, 2008, now U.S. Pat. No. 8,142,540, which is a national stage application of PCT/EP2006/003657, filed Apr. 21, 2006, which claims priority to U.S. Provisional Application No. 60/683,317, filed May 23, 2005, and European Patent Application No. 05076173.3, filed May 19, 2005, the entire contents of which are hereby incorporated by reference.

The invention relates to alloyed zinc powders, a key component for the manufacture of the anode of alkaline batteries.

Battery manufacturers are confronted with the well-known problem of the formation and accumulation of hydrogen gas within the battery, which is caused by the corrosion of the zinc powder by the alkaline electrolyte. Generation of gas increases the internal pressure in the cell. Safety systems are provided to prevent the explosion of the battery, but the risk of damage due to electrolyte leakage remains. Gassing may occur before use of the battery, i.e. during its shelf life; it typically also occurs after partial discharge, a phenomenon further on referred to as "PD gassing."

The capacity of a battery depends on the capability of the zinc powder to generate zinc ions and electrons according to:

$$Zn+2(OH)^- \rightarrow Zn(OH)_2 + 2e^- \qquad (1).$$

However, if the reaction medium is depleted in OH—, an irreversible reaction is induced, leading to the precipitation of ZnO on the surface of the zinc particles, passivating their surface. The end result is that part of the metallic zinc will not be available for the electrochemical reaction (1), thereby limiting the effective battery capacity to a fraction of its theoretical value. This phenomenon of passivation occurs mainly at high discharge rates, i.e. when the zinc particles release a high flux of zinc ions, while only a limited amount of hydroxide ions is available at the reaction sites.

Several patents, such as U.S. Pat. No. 6,284,410, claim good high drain discharge performances by using a fine zinc powder, as such, or in a blend with a coarse zinc powder. The high specific surface of the fine powder tends to enhance high drain discharge, but it unfortunately also limits the shelf life and increases the PD gassing.

The use of large flaky particles also tends to improve the high drain service and the shock resistance of the alkaline battery, as mentioned in U.S. Pat. No. 6,022,639. Other shapes like spheres, teardrops and strands were studied in WO 2004/012886. Unfortunately, these shapes greatly increase the gel viscosity, which leads to processing problems during the manufacture of batteries.

Low gassing, good process ability and high drain capability thus create conflicting demands. It is the aim of the present invention to solve this conflict.

Figure 1:
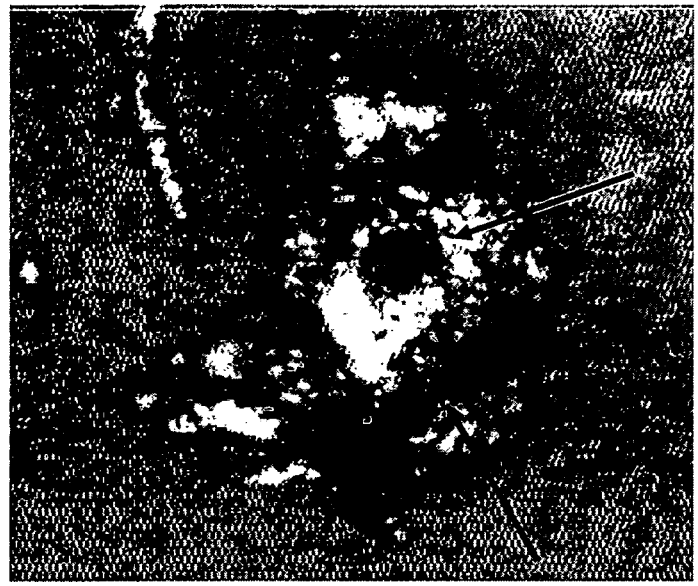
FIG. 1 is a photographic image showing a doubly-pierced particle of alloyed zinc powder according to the invention.

To this end, a new alloyed zinc powder for alkaline batteries comprising particles pierced with at least one hole in an amount of more than, either one or more, of: 10% by count in the sieving fraction 250 to 425 µm; and 3% by count in the sieving fraction 150 to 250 µm; and 2% by count in the sieving fraction 105 to 150 µm is presented. The zinc alloy powder in the sieving fraction 250 to 425 µm preferably comprises particles pierced with at least one hole in an amount of more than 20% by count, more preferably more than 30% by count, and still more preferably at least 31% by count, and even at least 36% by count. The above mentioned 'particles pierced with at least one hole' will in the remainder of the text be referred to as 'pierced particles.'

In a more specific embodiment, the powder comprises one or more of bismuth, indium and aluminum as alloying elements. Preferably, the alloy consists of either of: 0.001-0.05% by weight aluminum and 0.001-2% indium; 0.002-0.2% by weight bismuth and 0.001-2% indium; 0.002-0.2% by weight bismuth, 0.001-2% indium and 0.001-0.05% aluminum; and 0.002-0.2% by weight bismuth; and, optionally, up to 0.5% by weight of either one or both of lead and calcium, the remainder being zinc. Furthermore, a zinc powder consisting of 0.005-0.05% by weight Pb, the remainder being zinc, is also suitable. Said zinc may, as a matter of fact, also contain unavoidable impurities, such as those allowed in so-called Special High Grade (SHG) zinc.

As a further embodiment, this invention concerns alkaline batteries comprising an alloyed zinc powder according to anyone of the above criteria.

Alloyed zinc powders suitable for alkaline batteries can be produced by centrifugal atomization (CA), a process described in EP 1155464B1. Liquid zinc is hereby poured onto a disk, rotating rapidly in a protective oxygen-depleted atmosphere. This process results in the production of classical CA powders. For obtaining pierced particles according to this invention, it is however necessary to cool the atomization atmosphere to a temperature of less than 110° C., and preferable at a temperature of less than 100° C. This can be done by applying forced air cooling on the external walls of the atomization chamber. Advantageously, the atomization is performed in an atmosphere having an oxygen content of less than 8% by volume, and more preferably of more than 4% by volume.

Pierced particles allow for the use of coarser powders without penalizing the high drain capacity of the battery, while preserving the shelf life, limiting the PD gassing, and ensuring good processing capabilities. Conversely, pierced particles enhance the high drain behavior compared to classical powders with the same particle size distribution.

Hydroxide ions are produced at the cathode of the alkaline battery according to the reaction:

$$MnO_2 + H_2O + e^- \rightarrow MnOOH + OH^-.$$

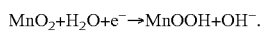

As explained above, these hydroxide ions are needed at the zinc at the anode, to avoid the passivating the surface of the zinc particles. It is assumed that pierced particles improve the diffusion of the hydroxide ion from cathode to anode, enhancing the so-called chemical homogeneity of the alkaline battery. This important property can be evaluated by a fast paced intermittent discharge test, where the battery can rest and homogenize for only a short period of time between high current discharge bursts.

Pierced particles can be detected and counted by direct visual observation under a microscope, or by using a shape analyzer like the ALPAGA® system of Occhio SA, Belgium.

Figure 2:
FIG. 2 is a photographic image showing a particle with a large pierced area.
Figure 3:
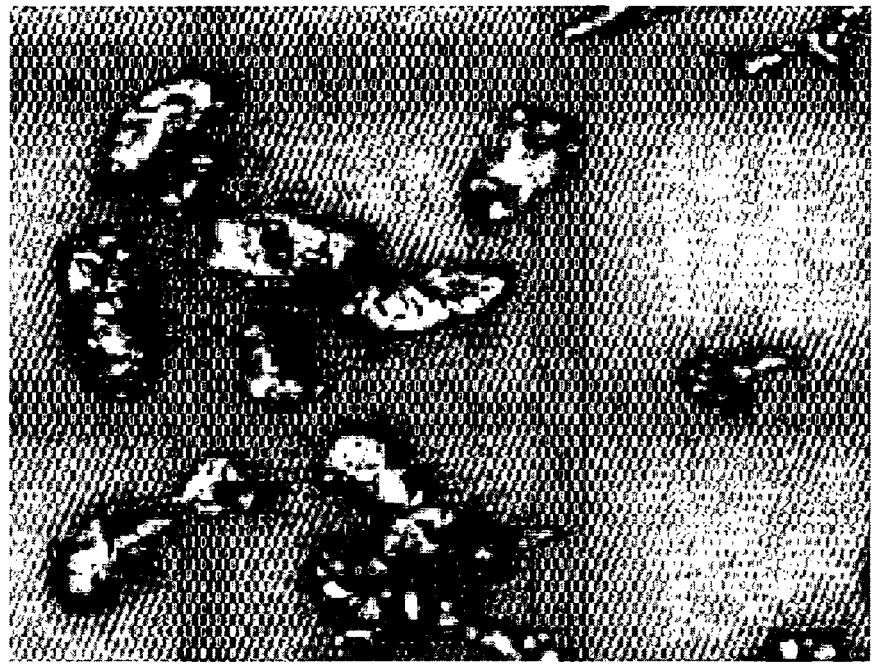
FIG. 3 is a photographic image showing particles of a classical centrifugally atomised powder.

The zinc powder of the invention shows particles pierced with at least one hole. The general shape of the zinc powder particle is typically a microscopic flake, which can e.g. be curved, hollow or cuplike. FIG. 1 shows a doubly-pierced particle of alloyed zinc powder according to the invention, whereas FIG. 2 represents a particle with a large pierced area. FIG. 3 shows the particles of a classical centrifugally atomized powder. Such zinc powders are much more rounded and are typically not pierced.

Figure 4:
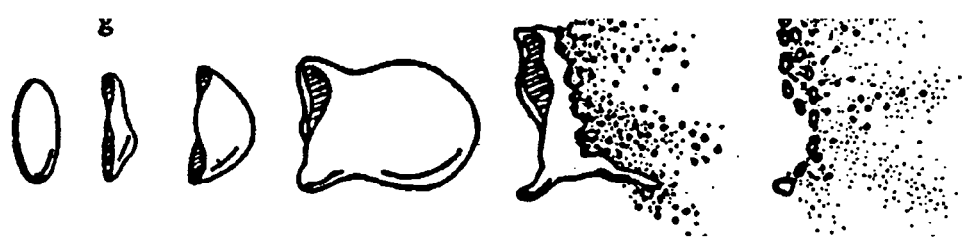
FIG. 4 is an illustration showing the liquid droplet break-up mechanism during secondary atomization.

In metal melt atomization, some authors, like A. J. Yule and J. J. Dunkley in the book "*Atomization of melts for Powder Production and Spray Deposition*", pp. 15-46, Clarendon Press, Oxford, 1994, refer to the possible existence of a atomization in two steps. The primary atomization is the formation of a droplet from the liquid metal. The secondary atomization is the further atomization of this droplet by air friction: the high relative velocity breaks up the droplet into smaller particles. This phenomenon is illustrated in FIG. 4, which shows the liquid droplet break-up mechanism during secondary atomization.

The process of the invention consists in applying proper atomization conditions to freeze the zinc particles early during the secondary atomization step in order to obtain a substantial fraction of pierced particles. This implies means to cool the atomization atmosphere.

EXAMPLE 1

Alloyed zinc powders were produced by centrifugal atomization: liquid zinc alloy at 480° C. was hereto poured onto a disk of 170 mm diameter rotating at 13000 rpm in a protective, oxygen-depleted atmosphere.

Table 1 compares the percentage by count of pierced particles observed in each sieving class in a classical CA zinc powder, i.e., without temperature control, to a powder produced according to the invention. Both powders were made using the same alloy consisting of zinc with 200 ppm In, 100 ppm Bi and 100 ppm Al. Both were atomized in an atmosphere containing 6.25% by volume of oxygen. The classical CA powder was manufactured without cooling the atomization atmosphere, resulting in an ambient temperature of about 160° C., whilst the powder according to the invention was manufactured with proper cooling, at 100° C. It is clear that the zinc powder according to the present invention has a much higher count of pierced particles, in particular in the coarser sieving fractions.

TABLE 1

Pierced particles by count versus sieving fraction in Zn powders

| | Pierced particles (count %) | |
|---|---|---|
| Sieving fraction (µm) | Classical CA powder | CA powder according to invention |
| 425-250 | 5 | 40 |
| 250-150 | 2 | 23 |
| 150-105 | 1 | 5 |
| 105-75 | 1 | 1 |
| 75-45 | 1 | 1 |
| 45-25 | 0 | 0 |
| <25 | 0 | 0 |

EXAMPLE 2

Figure 5:
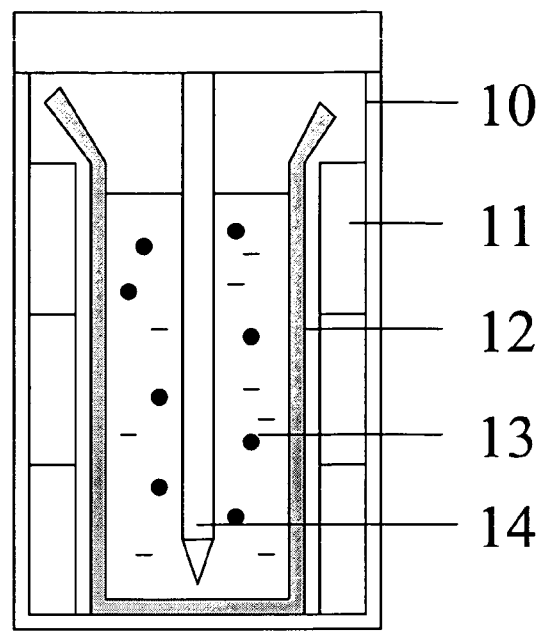
FIG. 5 is a schematic illustration depicting an electrochemical cell containing a cathode, an anode and a separator.

Electrochemical cells containing a cathode, an anode and a separator, as shown in FIG. 5, were prepared using zinc powders atomized as in Example 1. A can (10) contains the annular cathode mix (11), essentially composed of $MnO_2$, C and KOH. A separator paper (12) prevents shortcuts between the cathode and the anode mix (13). The current collector (14) allows collecting the electrons from the anode mix. Such a cell corresponds to a classic LR-6 battery.

The alkaline batteries were tested in 2 high drain discharge tests:

a 1 A continuous drainage test, with cut off at 1.0 V; and a 1 A intermittent drainage test with 10 seconds of discharge followed by 50 seconds of rest, with cut off at 0.9 V.

The total discharge times, normalized at 100% using the classical CA powder as a reference, are shown in Table 2.

TABLE 2

Influence of $O_2$ content during atomization on the pierced particle count in sieving fraction 425-250 µm, and on the high drain capacity of batteries

| | Pierced particles | Relative capacity (%) | |
|---|---|---|---|
| $O_2$ (volume %) | (count %) | 1 A intermittent | 1 A continuous |
| 1.75 | 11 | 102 | 100 |
| 2.5 | 12 | 107 | 100 |
| 3.25 | 13 | 110 | 102 |
| 4 | 31 | 114 | 104 |
| 4.75 | 36 | 114 | 106 |
| 5.5 | 38 | 115 | 105 |
| 6.25 | 40 | 117 | 108 |

Figure 6:
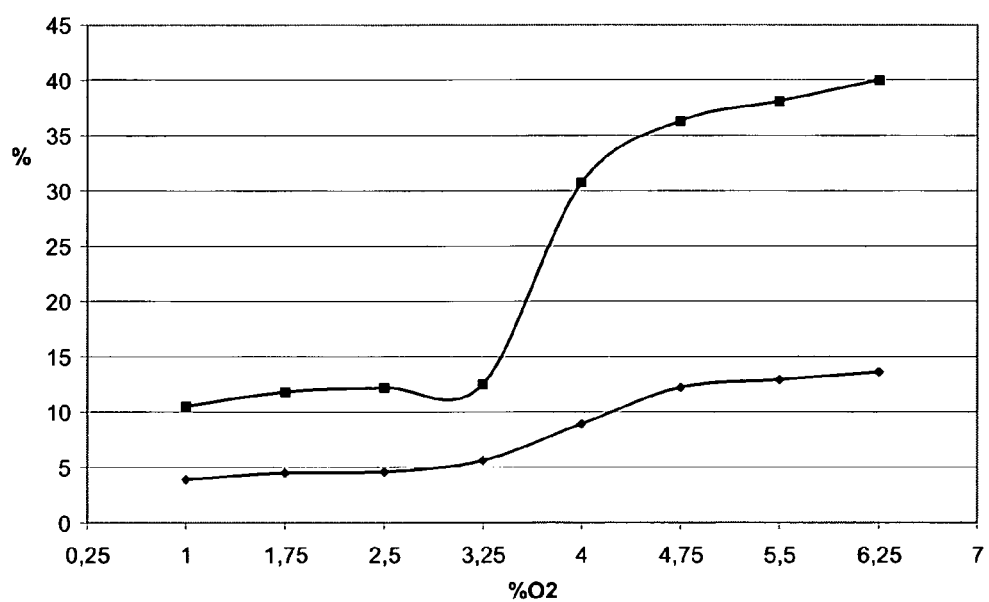
FIG. 6 is a graph showing the % of pierced particles as measured with the ALPAGA® system versus the oxygen % in the protective atmosphere of an atomisation chamber.

FIG. 6 represents the % of pierced particles as measured with the ALPAGA® system versus the oxygen % in the protective atmosphere of the atomization chamber. The upper curve shows the number of pierced particles in the 425-250 µm range, the lower curve shows the overall percentage of pierced particles.

These experiments confirm that the presence of pierced particles leads to very good results in high drain capacity, in comparison to a classical CA powder made with the same alloy. An oxygen content of more than 4% by volume is advantageous; it is however preferred to remain below 8%, as gassing of the powders otherwise tends to increase to an unacceptable level.

The invention claimed is:

1. A process for the manufacture of an alloyed zinc powder for alkaline batteries, comprising centrifugally atomizing a zinc alloy, wherein the atmosphere in the centrifugal atomization chamber, having an oxygen content of more than 4% by volume, is held at a temperature of less than 110° C.

2. The process of claim 1, wherein the atmosphere in the centrifugal atomization chamber is held at a temperature of less than 100° C.

3. The process of claim 1, wherein the atomization is performed in a protective atmosphere having an oxygen content of less than 8% by volume.

\* \* \* \* \*

UNITED STATES PATENT AND TRADEMARK OFFICE
CERTIFICATE OF CORRECTION

Page 1 of 1

PATENT NO. : 8,545,596 B2
APPLICATION NO. : 13/306071
DATED : October 1, 2013
INVENTOR(S) : Henninot et al.

It is certified that error appears in the above-identified patent and that said Letters Patent is hereby corrected as shown below:

On the Title Page: Item (62) Related U.S. Application Data, after "application No. 11/914,501,", replace "filed as application" with the following:

--filed Apr. 18, 2008, which is a national stage application of International Application--

Signed and Sealed this
Third Day of December, 2013

Margaret A. Focarino
*Commissioner for Patents of the United States Patent and Trademark Office*